(12) United States Patent
Tsukahara et al.

(10) Patent No.: US 6,467,732 B2
(45) Date of Patent: Oct. 22, 2002

(54) ROTARY BLADE OF HELICOPTER

(75) Inventors: Takanori Tsukahara; Masahiro Obukata, both of Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/790,559

(22) Filed: Feb. 23, 2001

(65) Prior Publication Data
US 2001/0023907 A1 Sep. 27, 2001

(30) Foreign Application Priority Data
Feb. 23, 2000 (JP) .................................. 2000-045774

(51) Int. Cl.$^7$ .............................................. B64C 23/06
(52) U.S. Cl. .................... 244/199; 244/17.11; 244/198
(58) Field of Search ............................. 244/1 N, 17.11, 244/35 R, 198, 199, 200, 201; 416/225, 228

(56) References Cited

U.S. PATENT DOCUMENTS

| | | | |
|---|---|---|---|
| 2,743,888 A | * | 5/1956 | Lippisch ...................... 244/43 |
| 4,046,336 A | | 9/1977 | Tangler |
| 4,595,160 A | | 6/1986 | Santos |
| 4,671,473 A | | 6/1987 | Goodson |
| 4,722,499 A | | 2/1988 | Klug |
| 5,823,480 A | | 10/1998 | La Roche |
| 5,992,793 A | * | 11/1999 | Perry et al. .............. 244/17.11 |
| 6,168,383 B1 | * | 1/2001 | Shimizu ...................... 416/228 |

FOREIGN PATENT DOCUMENTS

| | | |
|---|---|---|
| DE | 2149956 | 4/1973 |
| JP | 04314693 | 5/1992 |
| JP | 4-262994 | 9/1992 |
| JP | 10-316098 | 2/1998 |
| WO | WO-8800153 A1 * | 1/1988 .................. 244/199 |

OTHER PUBLICATIONS

Patent Abstracts of Japan, vol. 017, No. 136 (M–1384), Mar. 19, 1993 & JP 04 314693, Nov. 5, 1992.

* cited by examiner

*Primary Examiner*—Charles T. Jordan
*Assistant Examiner*—Gabriel S. Sukman
(74) *Attorney, Agent, or Firm*—Smith, Gambrell & Russell, LLP

(57) ABSTRACT

A base wing 11, as attached at its root end portion to the rotor head of a rotational drive unit, is provided with a front wing 12 and a rear wing 13 having substantially equal spans. The vortex, as generated at the wing tip, is divided into relatively weak tip vortexes of a front wing vortex 12c generated at the tip of the front wing and a rear wing vortex 13c generated at the tip of the rear wing 13. Since the front wing 12 and the rear wing 13 have equal spans, on the other hand, the front wing vortex 12c and the rear wing vortex 13c are close to each other so that they interact positively with each other and are weakened and diffused. As a result, while the helicopter is hovering, the interactions between the retreating rotor blade of the rotor and the tip vortex generated by the tip of the advancing rotor blade are drastically reduced to suppress the occurrence of the BVI noises.

10 Claims, 12 Drawing Sheets

BLADE LOWER SIDE | BLADE UPPER SIDE

ROTARY BLADE OF HELICOPTER

BACKGROUND OF THE INVENTION

1. Field of the Invention

The present invention relates to a rotor of a helicopter and, more particularly, to a rotor blade of a helicopter for reducing its noises.

2. Description of the Related Art

Especially when the helicopter is to land, the blade of the rotor interacts with the tip vortex, as generated from the tip of the advancing rotor blade, to generate the BVI noises. It is known that the magnitude of the BVI noises depends upon such a planar shape of the tip of the rotor blade as generates the tip vortex.

Figure 12:
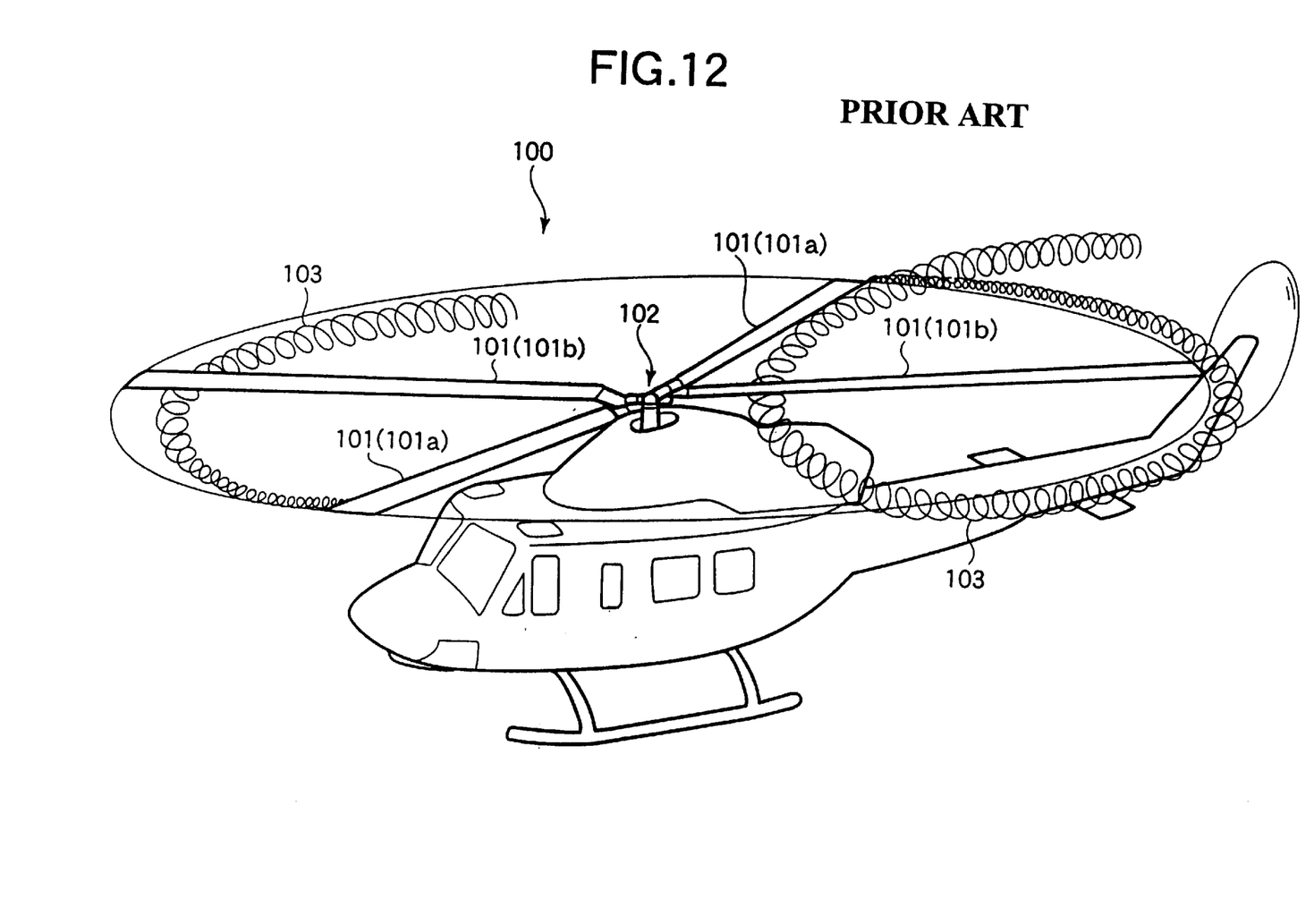
FIG. 12 is an explanatory diagram showing the rotor blades of a helicopter of the conventional art schematically.
Figure 13:
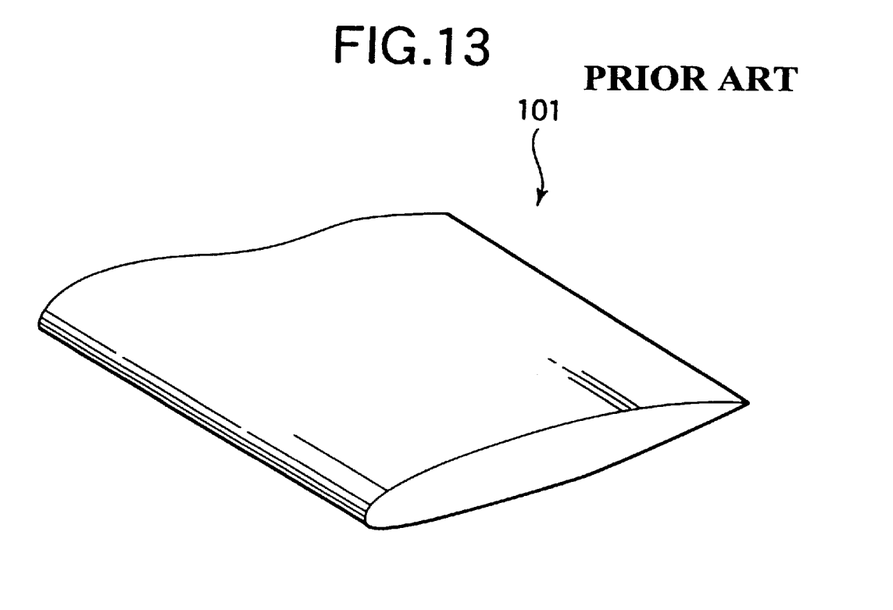
FIG. 13 is a perspective view showing a rotor blade of the conventional art schematically.

A rotor 100 of a helicopter is provided, as shown in FIG. 12, with a plurality of rotor blades 101, each of which has a generally rectangular shape, as its tip is shown in FIG. 13, for example, and which rotate on the center of rotation 102.

Especially when the helicopter is to land, the tip trailing edge vortex 103, as generated at the tip of an advancing rotor blade 101a, does not quickly fall so that a retreating rotor blade 101b interacts with the tip trailing edge vortex 103 generated at the tip of the rotor blade 101a, thereby to cause the BVI noises.

Figure 14:
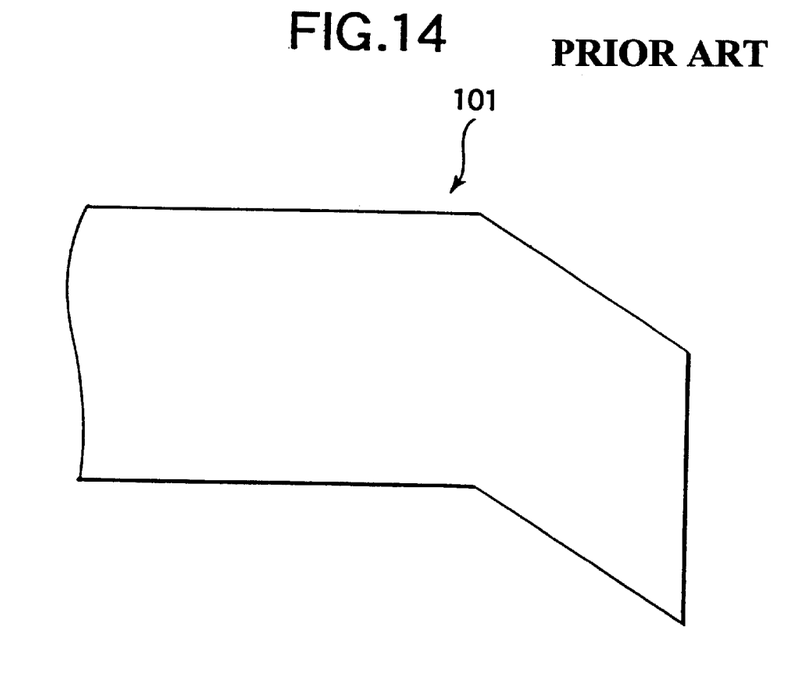
FIG. 14 is a perspective view showing a rotor blade of the conventional art schematically.

As shown in FIG. 14, on the other hand, there is a method for reducing the shock noises by giving a sweepback angle to the tip of the rotor blade 101 to lower the airspeed and weaken the shock waves. However, this tip shape cannot lower the BVI noises.

Thus, many investigations have been made on the tip shape for reducing the BVI noises by changing the tip vortex generations which determine the magnitude of the BVI noises of the helicopter.

Figure 15:
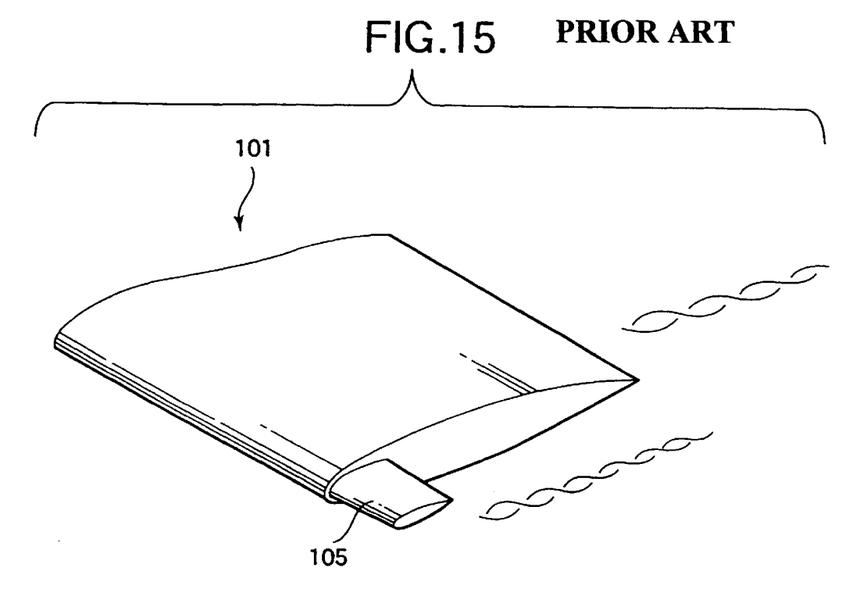
FIG. 15 is a perspective view showing a rotor blade of the conventional art schematically.

As shown in FIG. 15, for example, the tip vortex to be generated is halved and weakened by mounting a small wing 105 having a rectangular shape to the leading edge of the rectangular tip of the rotor blade 101, so that the BVI noises can be lowered.

Figure 16:
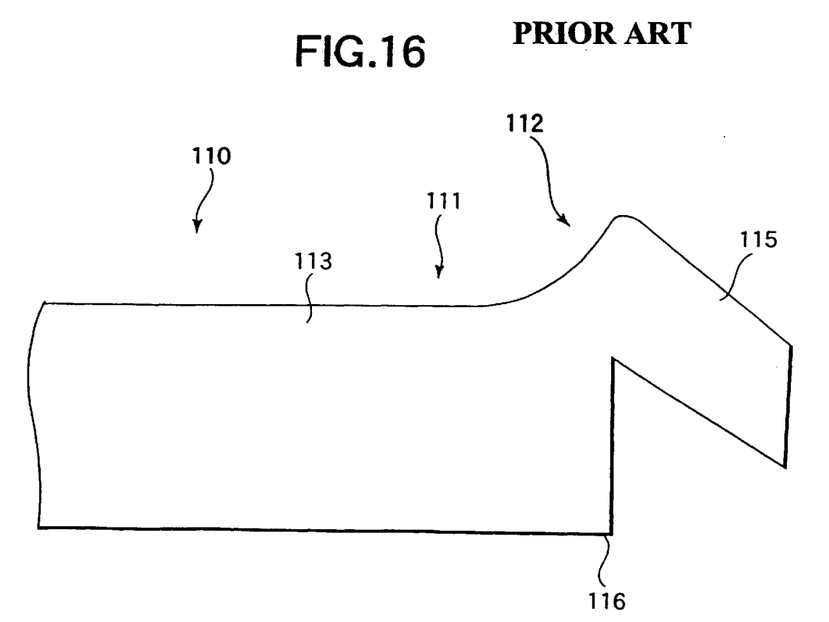
FIG. 16 is a perspective view showing a rotor blade of the conventional art schematically.

On the other hand, a rotor blade 110, as disclosed in Unexamined Published Japanese Patent Application No. 4-262994, is provided with a leading blade 115 merging into a base wing 113 of an airfoil section having a leading edge 112, as shown in a top plan shape of a tip portion 111 in FIG. 16.

Figure 17:
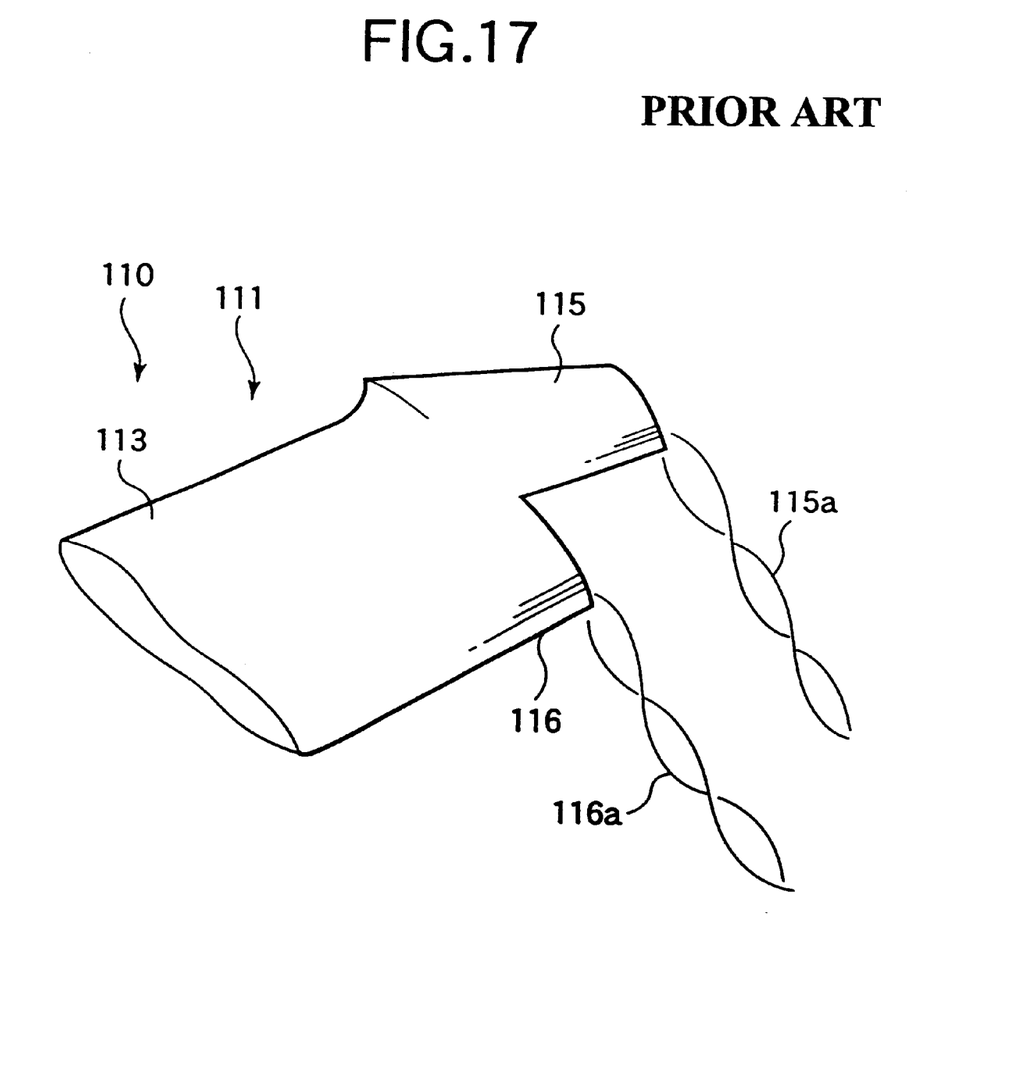
FIG. 17 is a perspective view illustrating the situations of the tip vortices generated by the rotor blade of the conventional art.

As shown in FIG. 17, the vortex emanating from the rotor blade 110 is halved into tip vortices of substantially equal intensities, i.e., a vortex 115a emanating from the leading blade 115 and as vortex 116a emanating from a trailing wing 116, as located on the inner side of the leading wing 115, thereby to reduce the BVI noises.

The aforementioned rotor blade 110 of Unexamined Published Japanese Patent Application No. 4-262994 suppresses the influences of the BVI by making a division into the two vortices of substantially equal intensities, that is, the vortex 115a emanating from the leading wing 115 and the vortex 116a emanating from the trailing wing 116.

This construction is characterized in that the span of the leading wind 115 is made larger by 50% or more than the chord length of the base wing 113 by generating the two vortexes of substantially equal intensities to hold these vortexes in the separate state as long as possible. The effect of the interactions of the vortexes is weak, and the leading wing 115 is made slender thereby to make it necessary to enhance especially the strength of the root portion of the leading wing 115.

SUMMARY OF THE INVENTION

Therefore, the invention has been conceived in view of those points and has an object to provide a rotor blade of a helicopter, which is intended to reduce the noises by dividing the tip vortex, as might otherwise cause the BVI noises of the helicopter, and by causing the divided tip vortexes to interact positively with each other thereby to diffuse them.

In order to achieve the above-specified object, according to an embodiment of the invention, there is provided a rotor blade of a helicopter, which is attached at its root portion to the rotor head of a rotational drive unit, characterized by comprising: a base wing attached at its root portion to the rotor head of the rotational drive unit; and a plurality of small wings having substantially equal spans and disposed at the tip of said base wing.

According to the invention the vortex generated at the wing tip is divided into the plurality of relatively weak tip vortices generated at the tips of the individual small wings, and the individual small wings have the equal spans. Therefore, the vortices generated at the tips of the individual small wings are close to each other and interfere positively with each other and are weakened and diffused. As a result, when the helicopter is to land, the pressure fluctuations, as might otherwise be caused by the interactions between the retreating rotor blade and the tip vortices generated at the tip of the advancing rotor blade, are drastically reduced to suppress the occurrence of the BVI noises.

According to another embodiment of the invention a rotor blade of a helicopter is characterized in that said small wings include: a front wing having a leading edge merging into the leading edge of said base wing; and a rear wing spaced from said front wing and having a trailing edge merging into the trailing edge of said base wing.

The invention restricts the small wings, specifically the front wing and the rear wing. The vortex generated at the wing tip is divided into the two vortices, i.e., the front wing vortex generated at the tip of the front wing and the rear wing vortex generated at the tip of the rear wing. The front wing vortex generated at the front wing moves over the rear wing backward of the rear wing, and the rear wing vortex generated at the tip of the rear wing also moves backward so that the front wing vortex and the rear wing vortex interact positively with each other and are weakened and diffused to suppress the occurrence of the BVI noises.

In a further embodiment of the invention, said base wing has a rectangular tip shape; in that said front wing has a rectangular wing shape having a chord length of about 20% to 30% of the chord length of said base wing; in that said rear wing has a rectangular wing shape having a chord length of about 30% to 50% of the chord length of said base wing; and in that said front wing and said rear wing have substantially equal spans of about 20 to 30% of the chord length of said base wing and are spaced by about 20% to 50% of the chord length of said base wing.

In yet another embodiment of the invention, the front wing and the rear wing having the rectangular shape are arranged at the base wing having the rectangular tip shape, so that the front wing vortex and the rear wing vortex are efficiently caused to interact with each other and are diffused by setting the chord lengths and the spans of the front wing and the rear wing and the spacing between the front wing and the rear wing to the above-specified ranges.

In still another embodiment of the invention, said base wing has a tip shape of a sweepback angle of about 20 degrees to 40 degrees; in that said front wing has a wing shape having a chord length of about 20% to 30% of the chord length of said base wing and a sweepback angle of 20 degrees to 40 degrees; in that said rear wing has a wing shape having a chord length of about 30% to 50% of the chord length of said base wing and a sweepback angle of 20 degrees to 40 degrees; and in that said front wing and said rear wing have substantially equal spans of about 20% to 30% of the chord length of said base wing and are spaced by about 20% to 50% of the chord length of said base wing.

According to the invention, the base wing has the sweepback angle, and the front wing and the rear wing have the sweepback angle, hence, the airspeed of the wing tip is decreased to damp the compressibility of the air thereby to weaken the shock waves and to improve the transonic characteristics.

In yet another embodiment of the invention, said base wing has a tip shape of a sweepback angle of about 20 degrees to 40 degrees; in that said front wing has a tapered wing shape having a root chord length of about 20% to 30% of the chord length of said base wing, a sweepback angle of 20 degrees to 40 degrees and a taper ratio of 0.8 or less; in that said rear wing has a tapered wing shape having a root chord length of about 30% to 50% of the chord length of said base wing, a sweepback angle of 20 degrees to 40 degrees and a taper ratio of 0.8 or less; and in that said front wing and said rear wing have substantially equal spans of about 20% to 30% of the chord length of said base wing.

According to another embodiment of the invention, the front wing and the rear wing are given the tapered shape so that the lift distribution of the wing edges is reduced to improve the damping of the tip vortexes better.

In yet another embodiment of the invention, said front wing and said rear wing have an anhedral angle of about 10 degrees to 30 degrees.

According to the invention, the front wing and the rear wing have the anhedral angle. Therefore, the tip vortex, as generated at the tip of the rotor blade while the helicopter is hovering and when the helicopter is to land, is positively released downward so that the interactions between the tip vortex generated by the advancing rotor blade and the retreating rotor blade are avoided to reduce the torque necessary for the rotation.

In another embodiment of the invention, said base wing has a rectangular tip shape; in that said small wings include: a front wing having a leading edge merging into the leading edge of said base wing; a rear wing spaced from said front wing and having a trailing edge merging into the trailing edge of said base wing; and an intermediate wing arranged between said front wing and said rear wing; in that said front wing, said rear wing and said intermediate wing individually have a rectangular wing shape having a chord length of about 25% of the chord length of the base wing; and in that said front wing and said intermediate wing, and said intermediate wing and said rear wing are individually spaced by about 12% of the chord length of said base wing.

According to another embodiment of the invention, the vortex generated at the wing tip is divided into the three weak vortices, as generated at the individual tips of the front wing, the intermediate wing and the rear wing, and these weak vortices are caused to interact with one another and are diffused so that the interactions between the retreating rotor blade of the rotor and the tip vortex generated from the tip of the advancing rotor blade are avoided or drastically reduced to suppress the occurrence of the BVI noises.

In yet another embodiment of the invention, there is included a variable control unit for controlling the incidence angles of said individual small wings variably at every azimuth angles of said rotor.

According to another embodiment the invention, at every azimuth angles varying with the rotation of the rotor blade, the incidence angles of the small wings can be variably controlled to cause the vortices, as generated from the tips of the individual small wings, to interact with each other and can be diffused to avoid the influences of the stall and the drag divergence.

BRIEF DESCRIPTION OF THE DRAWINGS

FIGS. 3A to 3C are explanatory diagrams of tip vortex diffusions, of which.

FIGS. 9A and 9B are explanatory diagrams of a rotor blade showing a fourth embodiment of the rotor blade of a helicopter according to the invention, of which

DETAILED DESCRIPTION OF THE PREFERED EMBODIMENT

Embodiments of the rotary blade of a helicopter according to the invention will be described with reference to the accompanying drawings.

Figure 1:
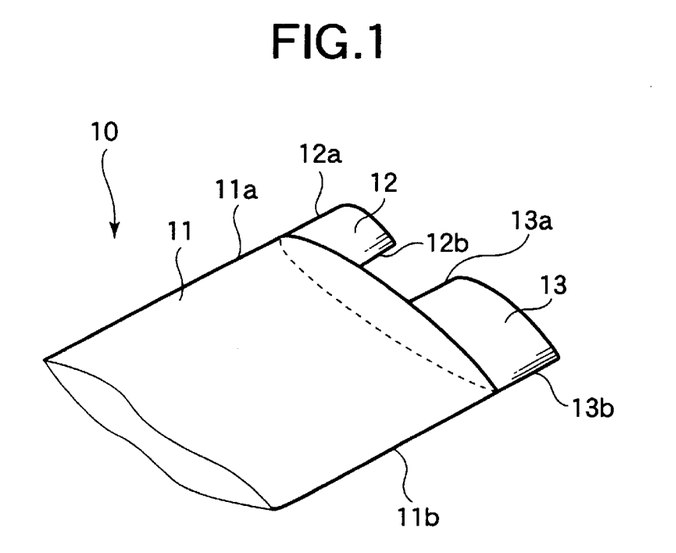
FIG. 1 is a perspective view showing the wing tip of a rotor blade for explaining a first embodiment of the rotor blade of a helicopter according to the invention.
Figure 2:
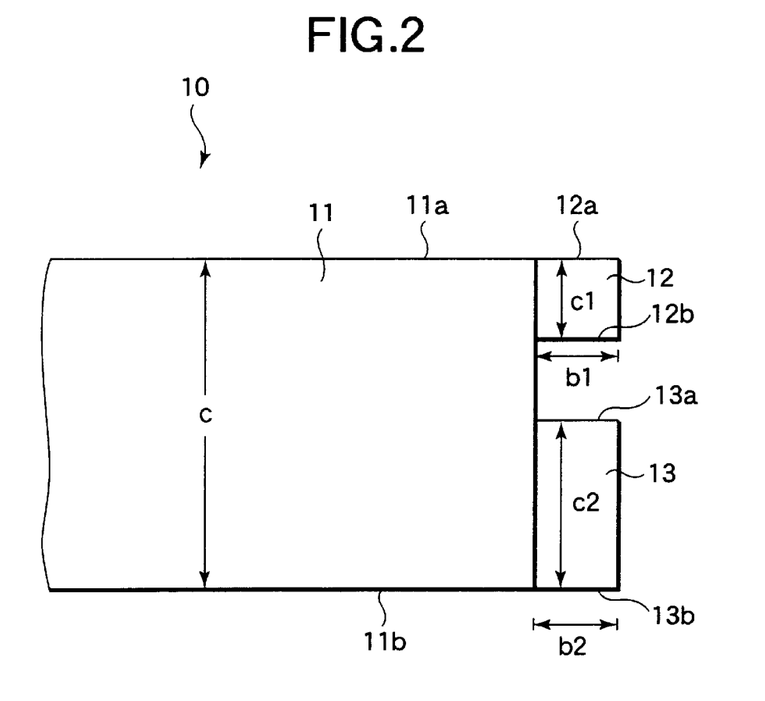
FIG. 2 is a top plan view of FIG. 1.

A first embodiment of the invention will be described with reference to FIGS. 1 to 5. FIG. 1 is a perspective view showing the tip of a rotor blade 10 of a helicopter according to this embodiment, and FIG. 2 is a top plan view of FIG. 1. The rotor blade 10, as shown in FIGS. 1 and 2, is attached in plurality to a (not-shown) rotor hub to form a rotor.

The rotor blade 10 is provided with a base wing 11 having a substantially equal chord length and a rectangular tip shape, and a smaller front wing 12 and a larger rear wing 13 disposed along its chord at the tip of the base wing 11.

The front wing 12 merges at its leading edge 12a into the leading edge 11a of the base wing 11 and is formed into such a rectangular shape as has a chord length c1 of 20 to 30% of the chord length c of the base wing 11 and a span b1 of 20% to 30% of the chord length c of the base wing 11.

On the other hand, the rear wing 13 merges at its trailing edge 13b into the trailing edge 11b of the base wing 11 and is formed into such a rectangular shape as has a chord length c2 of 30% to 50% of the chord length c of the base wing 11 and larger than the chord length c1 of the front wing 12 and a span b2 of 20% to 30% of the chord length c of the base wing 11 and substantially equal to the span b1 of the front wing 12. The trailing edge 12b of the front wing 12 and the leading edge 13a of the rear wing 13 is spaced by about 20% to 50% of the chord length c of the base wing 11.

Figure 3A:
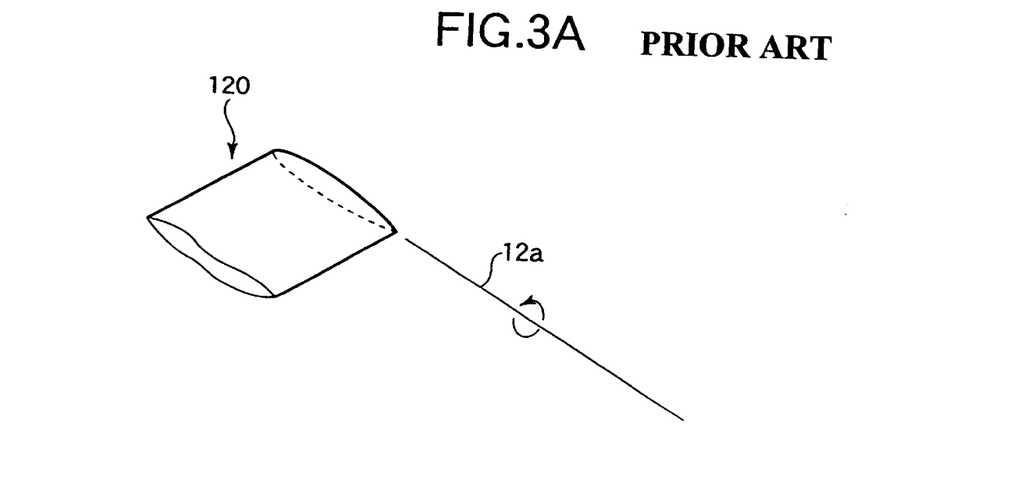
FIG. 3A is an explanatory diagram of the tip vortex at the conventional rotor blade.
Figure 3B:
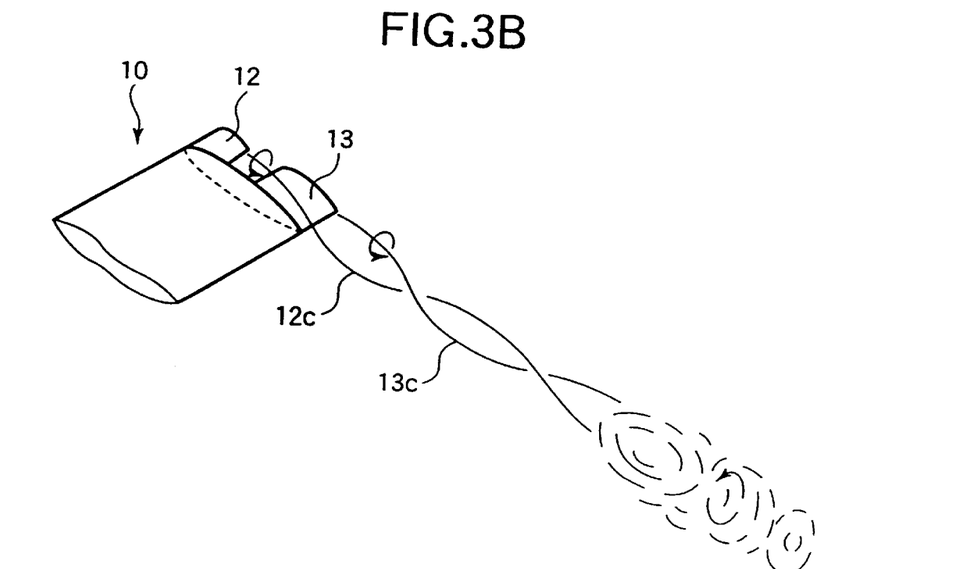
FIG. 3B is an explanatory diagram of the tip vortex of a front wing of the rotor blade according to this embodiment.
Figure 3C:
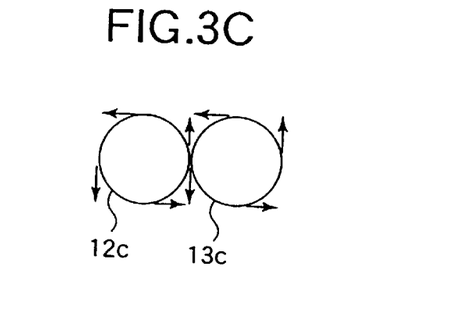
FIG. 3C is an explanatory view showing the tip vortex, as taken from the back.

The tip vortex diffusion will be compared between the tip of the rotor blade 10 thus formed and the conventional rectangular tip with reference to explanatory diagrams shown in FIGS. 3A to 3C. At a conventional rotor blade 120, as shown in FIG. 3A, an intense tip vortex 12a is generated at the tip and is carried backward without being diffused.

According to the rotor blade 10 shown in FIG. 3B according to this embodiment, on the contrary, the vortex to be generated at the tip is divided into two relatively weak vortices: an front wing vortex 12c generated at the tip of the front wing 12 and a rear wing vortex 13c generated at the tip of the rear wing 13. The front wing vortex 12c at the front wing moves over the rear wing 13 and backward over the vicinity of the root portion of the rear wing 13.

On the other hand, the rear wing vortex 13c generated at the tip of the rear wing 13 also moves backward. Here, the front wing 12 and the rear wing 13 have substantially equal spans b1 and b2. The front wing vortex 12c at the tip of the front wing 12 and the rear wing vortex 13c at the tip of the rear wing 13 are close to each other so that they positively interact with one other and are weakened and diffused, as illustrated in a rear elevation in FIG. 3C by the front wing vortex 12c and the rear wing vortex 13c.

As a result, the vortices to leave the rotor blade 10 are diffused and weakened so that the pressure fluctuations to be caused by the interactions between the tip vortices generated at the tips of the retreating rotor blade 10 and the advancing rotor blade 10 of the rotor when the helicopter is to land, for example, are drastically reduced to suppress the occurrence of the BVI noises.

Figure 4:
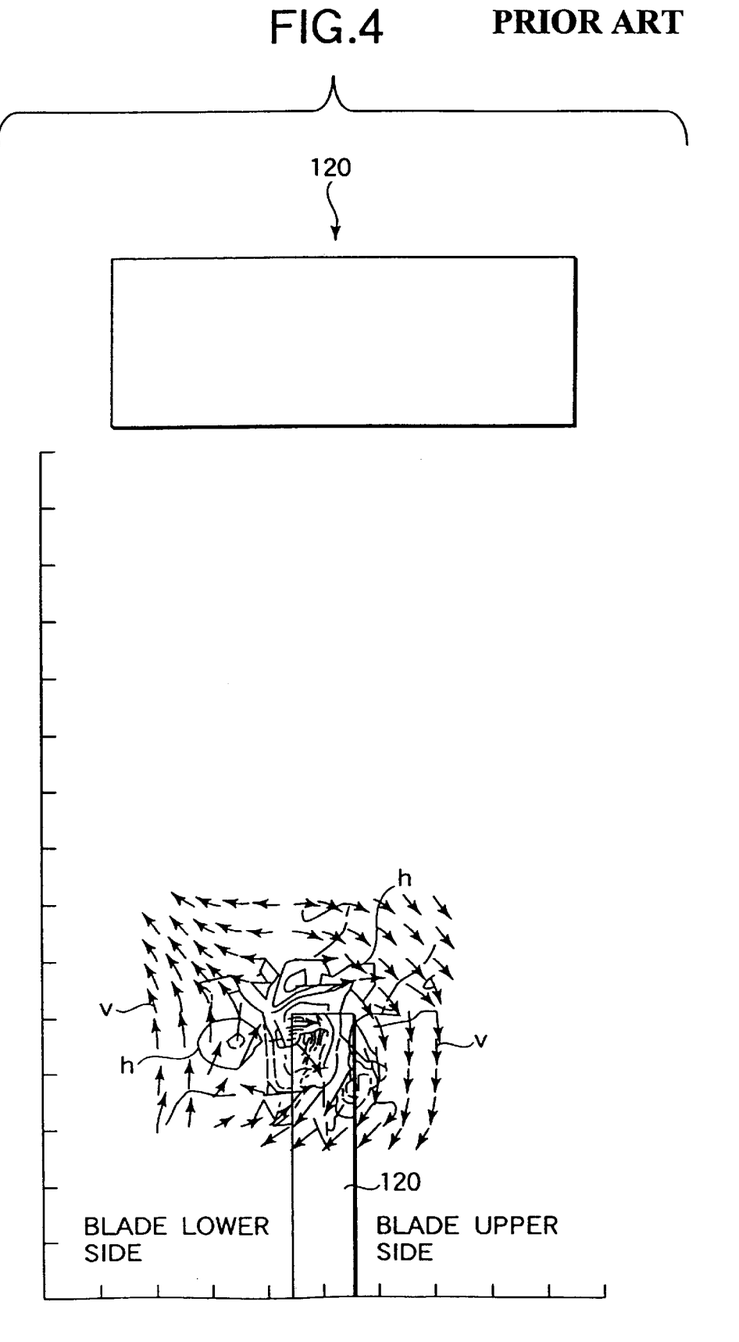
FIG. 4 is a result of a wind tunnel experiment illustrating the situations of the tip vortices generated by the conventional rotor blade.
Figure 5:
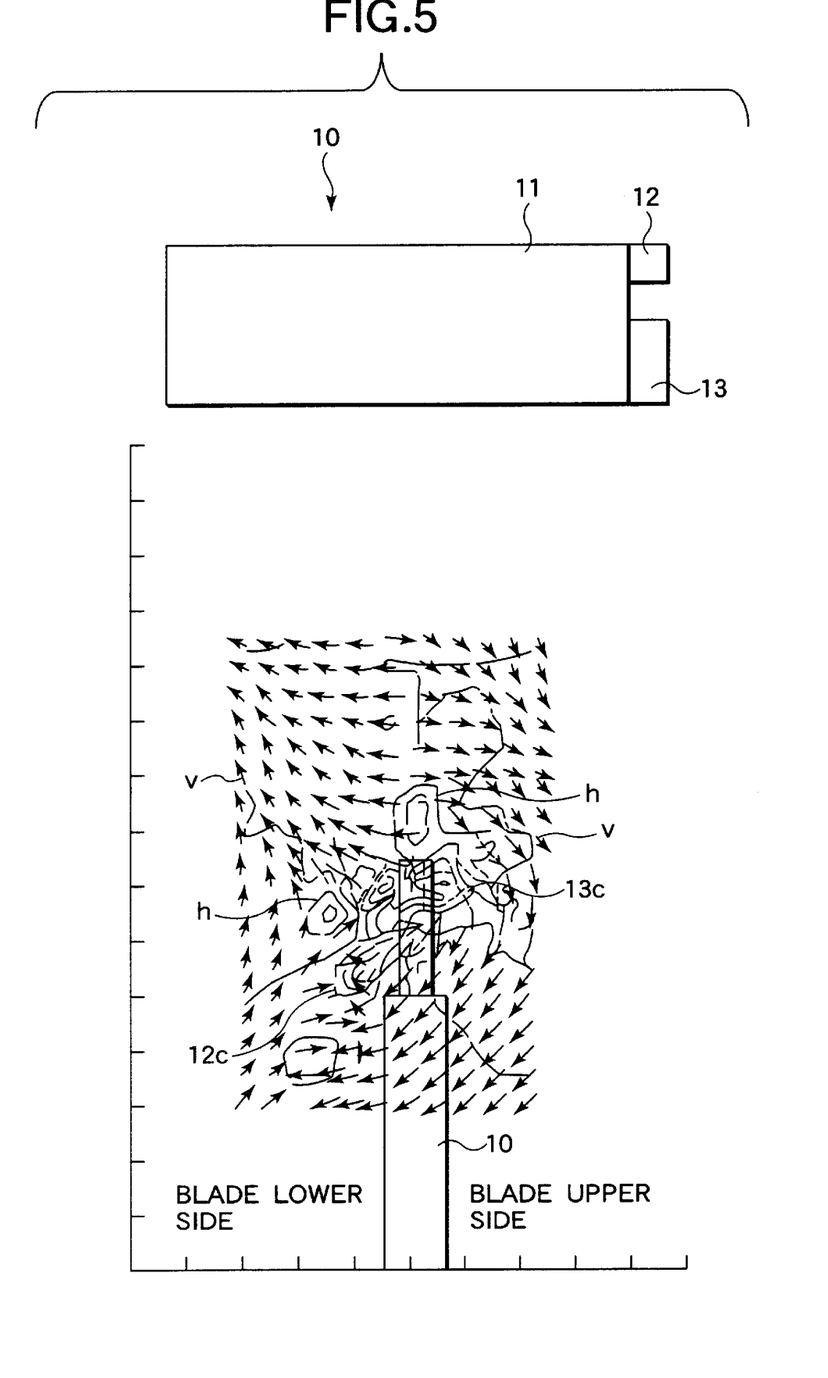
FIG. 5 is a result of a wind tunnel experiment illustrating the situations of the tip vortices generated by the rotor blade of this embodiment.
Figure 6:
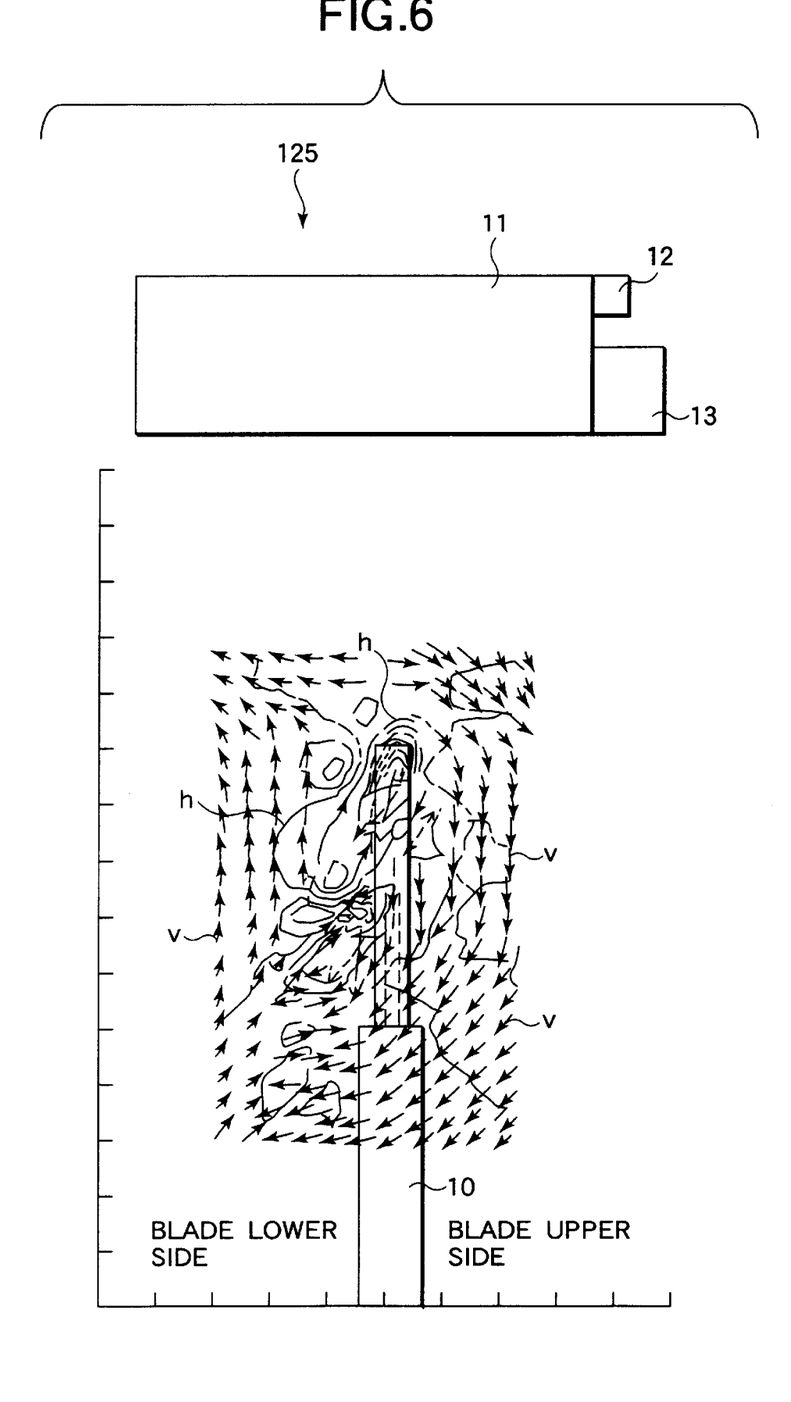
FIG. 6 is a result of a wind tunnel experiment illustrating the situations of the tip vortices generated by the rotor blade which is provided with a front wing and a rear wing having different spans.

With reference to FIGS. 4 to 6, the situations of the tip vortices generated by the conventional rotor blades and the rotor blades according to this embodiment will be compared by the results of wind tunnel test.

FIGS. 4 and 5 illustrate vorticity contour lines h and slip flow velocity vectors v, as taken at a wind speed of 40 m/s and at an angle of incidence of 10 degrees, at positions which are located backward by one chord length from the individual trailing edges of the rotor blade 120 having the rectangular tip and the rotor blade 10 of this embodiment. Here, the density of the vorticity contour lines h is thin, and as the magnitude of the slip flow velocity vectors is smaller, the vortex diffusion is improved thereby to lower the level of the BVI noises.

The comparison of the results of wind tunnel experiments of FIGS. 4 and 5 reveals that the tip vortex of FIG. 5 is divided into weaker ones because it is divided into the front wing vortex 12c and the rear wing vortex 13c to make the density of the vorticity contour lines h thinner than that of the vorticity contour lines h of the tip vortex of FIG. 4.

On the other hand, FIG. 6 illustrates the vorticity contour lines h and the slip flow velocity vectors v, as taken at the wind speed of 40 m/s and at the incidence angle of 10 degrees, at positions located backward by one chord length from the trailing edge of a rotor blade 125 of this embodiment, in which the span b2 of the rear wing 13 is made longer than the span b1 of the front wing 12.

The comparison of the results of the wind tunnel experiments of FIGS. 6 and 5 reveals that the slip flow velocity vectors v in the vicinity of the vortex of FIG. 5 decreases by about 20% from that of FIG. 6. Specifically, it is found that the maximum velocity of the rotor blade 10 according to this embodiment shown in FIG. 5 decreases from that of the rotor blade 125 shown in FIG. 6, and it is confirmed that the interaction, i.e., the diffusion between the front wing vortex 12c and the rear wing vortex 13c is efficiently effected by equalizing the spans b1 and b2 of the front wing 12 and the rear wing 13 substantially.

Figure 7:
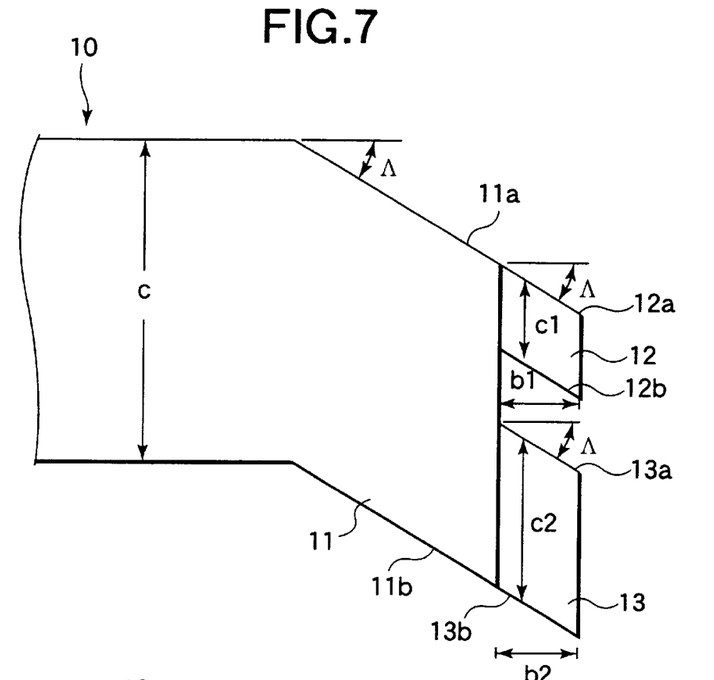
FIG. 7 is a top plan view showing the wing tip of a rotor blade for explaining a second embodiment of the rotor blade of a helicopter according to the invention.

Here will be described a second embodiment of the invention with reference to FIG. 7. FIG. 7 is a top plan view showing the tip of the rotor blade 10 corresponding to that of the first embodiment of FIG. 2, as will be described mainly on different portions by designating the corresponding portions by the common reference numerals to omit their detailed descriptions.

According to this embodiment, the base wing 11 of the rotor blade 10 has a generally equal chord length c and is formed into a sweepback tip shape having a sweepback angle $\Lambda$ of 20 degrees to 40 degrees. On the other hand, the front wing 12 is provided with the leading edge 12a and the trailing edge 12b having the sweepback angle $\Lambda$ of 20 degrees to 40 degrees and is formed to have the chord length c1 of 20% to 30% of the chord length c of the base wing 11 and the span b1 of 20% to 30% of the chord length c of the base wing 11.

On the other hand, the rear wing 13 is provided with the leading edge 13a and the trailing edge 13b having the sweepback angle $\Lambda$ of 20 degrees to 40 degrees and has a chord length c2 of 30% to 50%, preferably of 30% to 40% of the chord length c of the base wing 11 and larger than the chord length c1 of the front wing 12 and a span b2 of 20% to 30% of the chord length c of the base wing 11 and substantially equal to the span b1 of the front wing 12. The trailing edge 12b of the Front wing 12 and the leading edge 13a of the rear wing 13 is spaced by about 20% to 50% of the chord length c of the base wing 11.

According to this embodiment thus formed, the base wing 11, the front wing 12 and the rear wing 13 have the sweepback angle $\Lambda$. In addition to the effects of the foregoing first embodiment, therefore, the airspeed of the wing tip is lowered to damp the compressibility of the air and weaken the shock waves thereby to improve the transonic characteristics.

Figure 8:
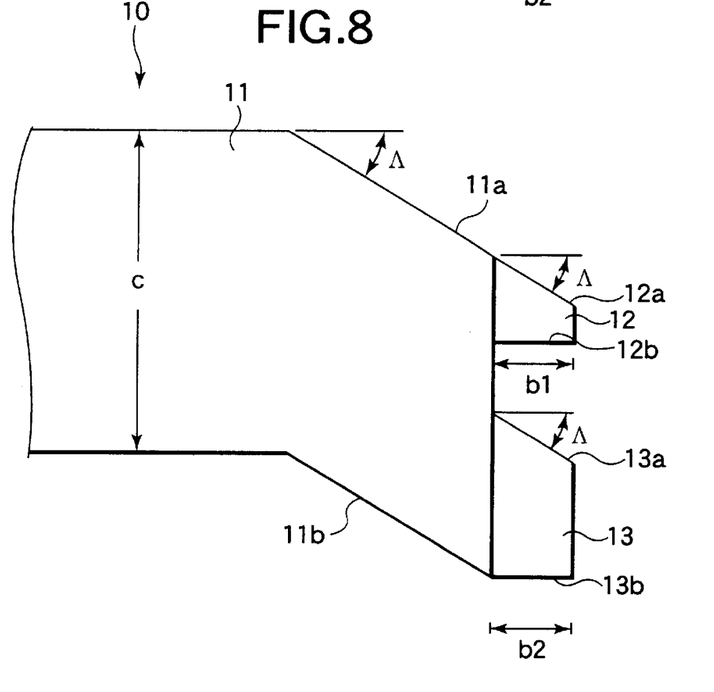
FIG. 8 is a top plan view showing the wing tip of a rotor blade for explaining a third embodiment of the rotor blade of a helicopter according to the invention.

Here will be described a third embodiment of the invention with reference to FIG. 8. FIG. 8 is a top plan view showing the tip of the rotor blade 10 corresponding to that of the aforementioned second embodiment, as will be described mainly on different portions by designating the corresponding portions by the common reference numerals to omit their detailed descriptions.

According to this embodiment, the base wing 11 of the rotor blade 10 has a generally equal chord length c and is formed into a sweepback tip shape having a sweepback angle Λ of 20 degrees to 40 degrees. The front wing 12 is provided with the leading edge 12a having a root portion chord length of about 20% to 30% of the chord length of the base wing 11 and a sweepback angle Λ of 20 to 40 degrees and is formed into such a tapered wing shape as has a span b1 of 20 to 30% of the chord length c of the base wing 11 and a smooth taper ratio of 0.8 or less from the root portion to the tip.

On the other hand, the rear wing 13 is provided with the leading edge 13a having a root portion chord length of about 30% to 50%, preferably of 30% to 40% of the chord length of the base wing 11 and a sweepback angle Λ of 20 degrees to 40 degrees and is formed into such a tapered wing shape as has a chord length of 30% to 40% of the chord length c of the base wing 11, a span b2 substantially equal to the span b1 of the front wing 12, and and a smooth taper ratio of 0.8 or less from the root portion to the tip.

According to this embodiment thus formed, the base wing 11, the front wing 12 and the rear wing 13 have the tapered shapes. In addition to the effects of the foregoing second embodiment, therefore, the lift distribution at the wing tip is reduced to improve the damping effect of the tip vortex better.

Here will be described a fourth embodiment of the invention with reference to FIG. 9.

Figure 9A:
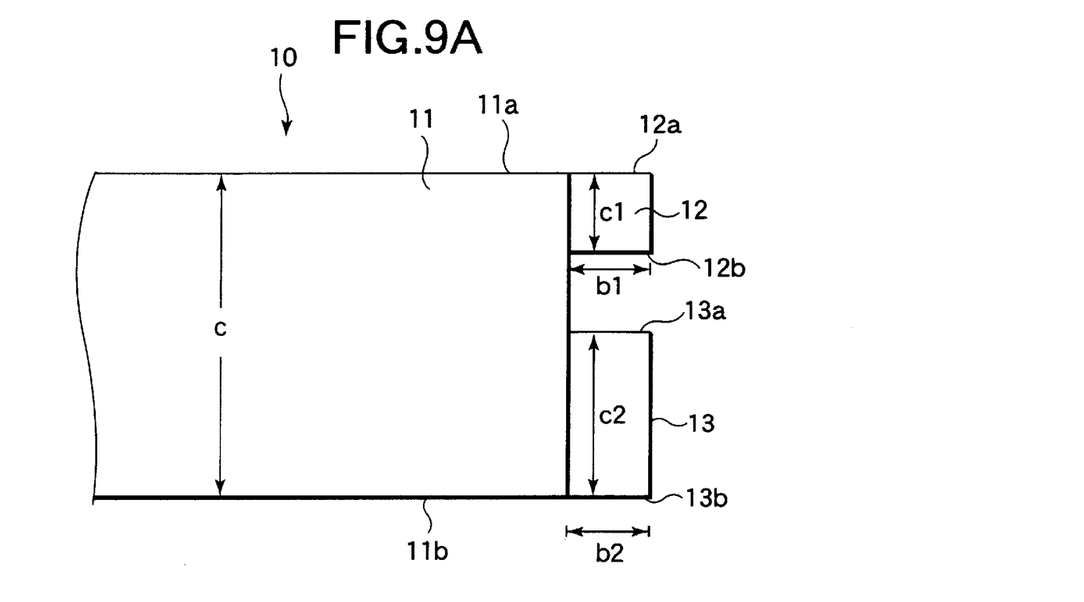
FIG. 9A is a top plan view showing the wing tip.
Figure 9B:
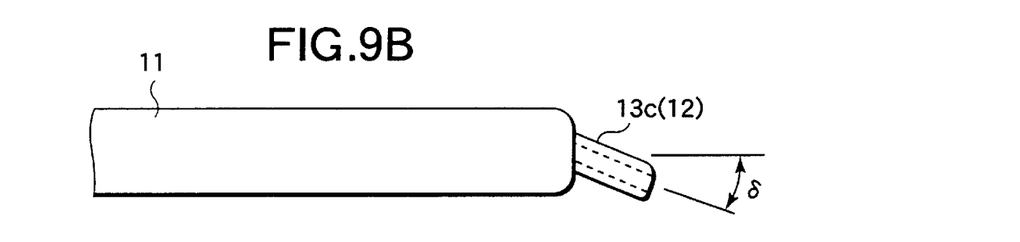
FIG. 9B is a side elevation.

FIGS. 9A and 9B present explanatory diagrams of a rotor blade 10 according to this embodiment. FIG. 9A is a top plan view of the tip of the rotor blade 10 corresponding to FIG. 2 of the foregoing first embodiment, and FIG. 9B is a side elevation of FIG. 9A. Here, this embodiment will be described mainly on different portions by designating the corresponding portions by the common reference numerals to omit their detailed descriptions.

The rotor blade 10 according to this embodiment is provided with the base wing 11 having a substantially equal chord length c and formed into a rectangular tip shape. At the tip end of the base wing 11, there are disposed at a spacing of about 20% to 30% of the chord length c of the base wing 11 the front wing 12 having a chord length c1 of 20% to 30% of the chord length c of the base wing 11 and a span b1 of 20% to 30% of the chord length c of the base wing 11, and the rear wing 13 having a chord length c2 of 30% to 50% of the chord length c of the base wing 11 and a span b2 substantially equal to the span b1 of the front wing 12. These front wing 12 and rear wing 13 have an anhedral angle δ of 10 degrees to 30 degrees, as shown in FIG. 9B.

According to the rotor blade 10 of this embodiment thus formed, in addition to the effects of the foregoing first embodiment, the front wing 12 and the rear wing 13 have the anhedral angle δ. Since the release position of the tip vortex is lowered, therefore, the tip vortex, as generated at the tip of the rotor blade while the helicopter is hovering or when the helicopter is to land, is positively released downward to avoid the interactions between the tip vortex generated by the advancing rotor blade and the retreating rotor blade thereby to reduce the torque necessary for the rotation.

Here will be described a fifth embodiment of the invention with reference to FIG. 10.

Figure 10:
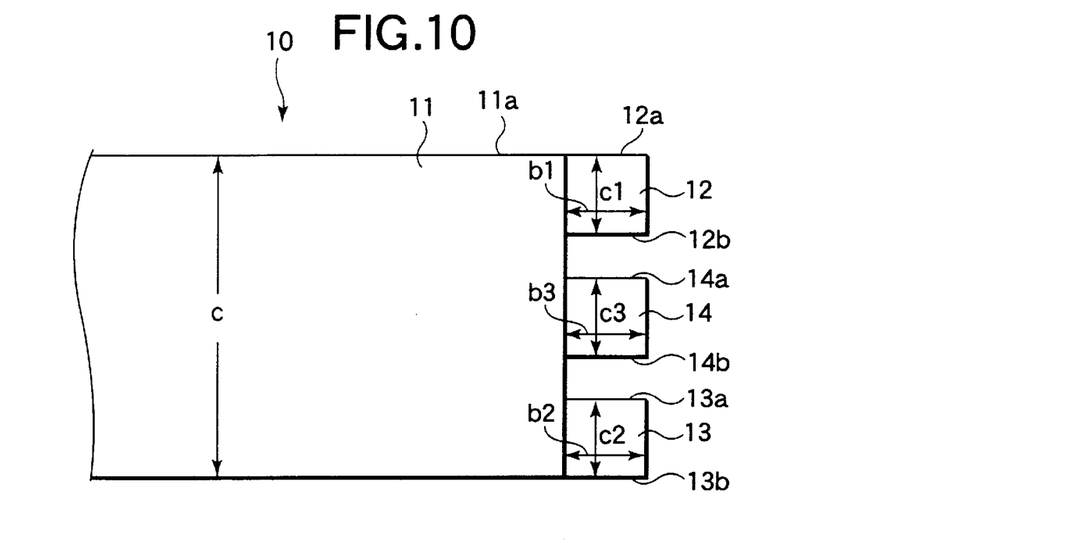
FIG. 10 is a top plan view showing the wing tip of a rotor blade for explaining a fifth embodiment of the rotor blade of a helicopter according to the invention.

FIG. 10 is a top plan view of the tip of a rotor blade 10 according to this embodiment. Here, this embodiment will be described mainly on different portions by designating the portions corresponding to those of FIG. 2 in the foregoing first embodiment by the common reference numerals to omit their detailed descriptions.

The rotor blade 10 is provided with a base wing 11 of a rectangular tip shape having a chord length c, a front wing 12 and a rear wing 13 disposed at the tip of the base wing 11, and an intermediate wing 14 between the front wing 12 and the rear wing 13.

The front wing 12, the rear wing 13 and the intermediate wing 14 are formed to have individual chord lengths c1, c2 and c3 of about 25% of the chord length c of the base wing 11 and individual spans b1, b2 and b3 substantially equal to one another and of 20% to 30% of the chord length c of the base wing 11.

The trailing edge 12b of the front wing 12 and the leading edge 14a of the intermediate wing 14, and the trailing edge 14b of the intermediate wing 14 and the leading edge 13a of the rear wing 13 are individually spaced from each other by about 12% of the chord length c of the base wing 11.

According to the rotor blade 10 thus constructed, the vortex to occur at the tip is divided into three weak rear wing vortices to occur at the individual tips of the front wing 12, the intermediate wing 14 and the rear wing 13, and these rear wing vortices interact and are diffused more effectively. As compared with the first embodiment, the pressure fluctuations, as caused by the interactions between the retreating rotor blade 10 of the rotor and the tip vortex to occur at the tip of the advancing rotor blade 10, are drastically reduced to suppress the occurrence of the BVI noises the more.

In this embodiment, on the other hand, the rectangular tip of the base wing 11 is provided with the three small wings of the front wing 12, the rear wing 13 and the intermediate wing 14, but could be equipped with four or more small wings, if necessary. Moreover, the front wing, the rear wing and the intermediate wing having the sweepback angle could be arranged at the sweepback base wing 11 having the sweepback angle Λ, as in the second embodiment. Moreover, the front wing, the rear wing and the intermediate wing could be tapered, as in the fourth embodiment, and these small wings could also be given the anhedral angle, as in the fourth embodiment.

Here will be described a sixth embodiment of the invention with reference to FIG. 11.

Figure 11:
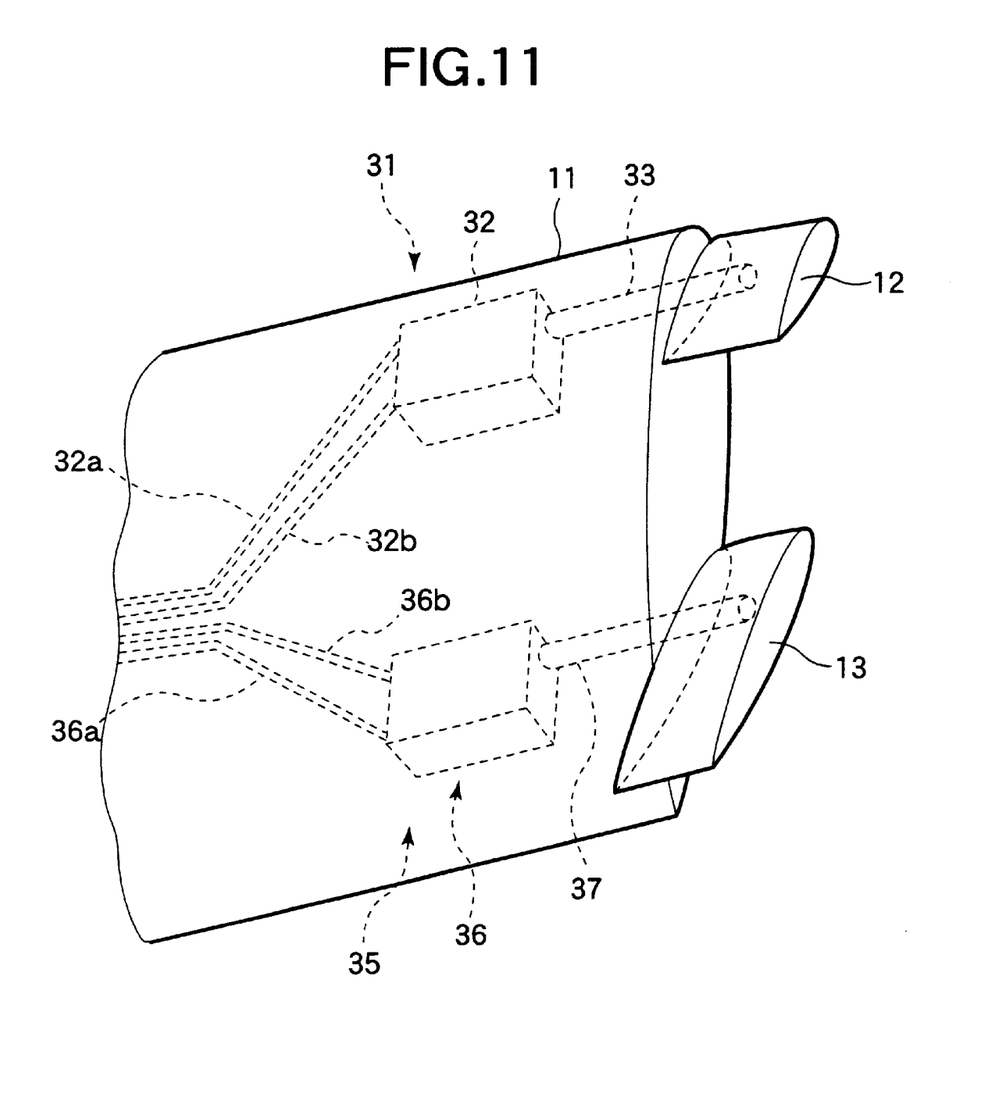
FIG. 11 is a perspective view of an essential portion showing the wing tip of a rotor blade for explaining a fifth embodiment of the rotor blade of a helicopter according to the invention.

FIG. 11 is a perspective view of an essential portion of a rotor blade 10 according to this embodiment. Here, this embodiment will be described mainly on different portions by designating the portions corresponding to those of FIG. 2 in the foregoing first embodiment by the common reference numerals to omit their detailed descriptions.

The rotor blade 10 is provided with a base wing 11 having a rectangular tip shape, and a front wing 12 and a rear wing 13 arranged at the tip of the base wing 11. The front wing 12 is formed to have a chord length of 20% to 30% of the chord length of the base wing 11 and a span of 20% to 30% of the chord length of the base wing 11, and is variably controlled at its incidence angle by variable control unit 31.

Likewise, the rear wing 13 is formed to have a chord length c of 30% to 50% of the chord length of the base wing 11 and a span substantially equal to the span of the front wing 12, and is variably controlled at its incidence angle by variable control unit 35.

The variable control unit 31 is provided with an actuator such as a servomotor or a hydraulic actuator, as exemplified by the servomotor 32 in this embodiment, and a shaft 33 protruding from the servomotor 32 and supporting the front wing 12 at the tip of the base wing 11.

On the other hand, the variable control unit 35 is provided with an actuator such as a servomotor or a hydraulic actuator, as exemplified by the servomotor 36 in this embodiment, and a shaft 37 protruding from the servomotor 36 and supporting the rear wing 13 at the tip of the base wing 11. Here, reference numerals 32a and 32b, and 36a and 36b designate power supply and signal cables to the servomotors 32 and 36, respectively.

At the time when the helicopter flies forward, the airspeed is added at the advancing rotor blade to the rotor blade speed, whereas the airspeed is subtracted at the retreating rotor blade from the rotor blade speed. As a result, the airspeed is so different between the advancing rotor blade and the retreating rotor blade that the advancing rotor blade is demanded for a lower drag in the transonic region because of its higher Mach number and smaller incidence angle whereas the retreating rotor blade is demanded for a reluctant stall in the subsonic region because of its lower Mach number and larger incidence angle.

At every azimuth angles varying with the rotation of the rotor blade 10, therefore, the individual incidence angles of the front wing 12 and the rear wing 13 are variably controlled by the servomotors 32 and 36 so that the front wing vortex generated at the tip of the front wing 12 and the rear wing vortex generated at the tip of the rear wing 13 can be efficiently caused to interact and diffused while avoiding the influences of the stall or the drag divergence.

On the other hand, there are arranged the two variable control unit 31 and 35 for controlling the incidence angles of the front wing 12 and the rear wing 13 variably, respectively. By associating the front wing 12 and the rear wing 13 with each other by one oscillating means, however, the structure could be simplified.

Here, the invention should not be limited to the foregoing embodiments but could be variously modified without departing from the gist thereof. In the base wing having the sweepback angle Λ as in the second embodiment, for example, the incidence angle of the front wing and the rear wing having the sweepback angle could be arranged in a controllable manner, as in the sixth embodiment, and the incidence angle of the tapered front and rear wings could be controlled, as in the fourth embodiment. On the other hand, these small wings having the controllable incidence angle could be given the anhedral angle, as in the fourth embodiment. Moreover, an intermediate wing could be arranged between the front wing and the rear wing.

According to the rotor blade of the helicopter of the invention thus far described, the base wing, as attached at its root end portion to the rotor head of the rotational drive unit, is provided at its tip with the plurality of small wings having the substantially equal spans. As a result, the vortex generated at the wing tip is divided into the plurality of relatively weak tip vortices generated at the tips of the individual small wings, and the tip vortices generated at the wing tips of the individual small wings are so close that they positively interact with one another and are weakened and diffused. As a result, the pressure fluctuations to be caused by the interactions between the tip vortices generated at the tips of the retreating rotor blade and the advancing rotor blade of the rotor are drastically reduced to suppress the occurrence of the BVI noises.

With the small wings being given the sweepback angle, on the other hand, the airspeed of the wing tip is lowered to damp the compressibility of the air and weaken the shock waves thereby to improve the transonic characteristics. Since the front wing and the rear wing are given the tapered shapes, on the other hand, the lift distribution at the wing tip is reduced to improve the damping effect of the tip vortex better.

By giving the anhedral angle to the small wings, moreover, the tip vortex, as generated at the tip of the rotor blade while the helicopter is hovering or when the helicopter is to land, is positively released downward to avoid the interactions between the tip vortex generated by the advancing rotor blade and the retreating rotor blade thereby to reduce the torque necessary for the rotation.

By controlling the incidence angles of the individual small wings variably at every azimuth angles of the rotor, on the other hand, the rear wing vortices generated from the tips of the individual small wings can be efficiently caused to interact and diffused while avoiding the influences of the stall or the drag divergence.

What is claimed is:

1. A rotor blade for a helicopter, which is attached at root portion thereof to a rotor head of a rotational drive unit, the rotor blade comprising:

a base wing having a rectangular tip shape and a substantially equal chord length; and a plurality of small wings including a front wing and a rear wing and disposed at the tip of said base wing, said small wings having substantially equal spans which are 20% to 30% of said chord length of said base wing.

2. The rotor blade according to claim 1, wherein said front wing has a leading edge merging into a leading edge of said base wing; and said rear wing is spaced from said front wing and has a trailing edge merging into a trailing edge of said base wing.

3. The rotor blade according to claim 2, wherein said front wing has a rectangular wing shape having a chord length of about 20% to 30% of said chord length of said base wing, said rear wing has a rectangular wing shape having a chord length of about 30% to 50% of said chord length of said base wing, said front wing and said rear wing are spaced by about 20% to 50% of the chord length of said base wing.

4. The rotor blade according to claim 2, wherein said base wing has a tip shape of a sweepback angle of about 20 degrees to 40 degrees;

said front wing has a wing shape having a chord length of about 20% to 30% of said chord length of said base wing and a leading edge having a sweepback angle of 20 degrees to 40 degrees, and said rear wing has a wing shape having a chord length of about 30% to 50% of said chord length of said base wing and a leading edge having a sweepback angle of 20 degrees to 40 degrees; and said front wing and said rear wing have substantially equal spans of about 20% to 30% of the chord length of said base wing and are spaced by about 20 to 50% of the chord length of said base wing.

5. The rotor blade according to claim 2, wherein said base wing has a tip shape of a sweepback angle of about 20 degrees to 40 degrees;

said front wing has a tapered wing shape having a root chord length of about 20% to 30% of said chord length of said base wing, a sweepback angle of 20 degrees to 40 degrees and a taper ratio of 0.8 or less;

said rear wing has a tapered wing shape having a root chord length of about 30% to 50% of said chord length of said base wing, a sweepback angle of 20 degrees to 40 degrees and a taper ratio of 0.8 or less.

6. The rotor blade according to claim 2, wherein said front wing and said rear wing have an anhedral angle of about 10 degrees to 30 degrees.

7. The rotor blade according to claim 2, wherein said small wings further include an intermediate wing arranged between said front wing and said rear wing, said front wing, said rear wing and said intermediate wing individually have a rectangular wing shape having a chord length of about 25% of said chord length of the base wing; and said front wing and said intermediate wing, and said intermediate wing and said rear wing are individually spaced by about 12% of said chord length of said base wing.

8. The rotor blade according to claim 1, comprising:

variable control unit which controls incidence angles of said individual small wings variably at every azimuth angles of said rotor blade.

9. The rotor blade according to claim 1, wherein said front and rear wings are spaced by about 20% to 50% of said chord length of said base wing.

10. The rotor blade according to claim 1, wherein said front wing has a leading edge having a sweepback angle of 20 degrees to 40 degrees, and said rear wing has a leading edge having a sweepback angle of 20 degrees to 40 degrees.

* * * * *